(12) United States Patent
Kaizu et al.

(10) Patent No.: US 7,443,622 B2
(45) Date of Patent: Oct. 28, 2008

(54) MAGNETIC RECORDING MEDIUM, MAGNETIC RECORDING/REPRODUCING APPARATUS, AND STAMPER FOR MANUFACTURING THE MAGNETIC RECORDING MEDIUM

(75) Inventors: Akimasa Kaizu, Tokyo (JP); Makoto Moriya, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 137 days.

(21) Appl. No.: 11/213,786

(22) Filed: Aug. 30, 2005

(65) Prior Publication Data
US 2006/0050426 A1    Mar. 9, 2006

(30) Foreign Application Priority Data
Sep. 3, 2004    (JP)    ............................. 2004-257442
Jun. 8, 2005    (JP)    ............................. 2005-168048

(51) Int. Cl.
*G11B 5/86*    (2006.01)

(52) U.S. Cl. ............................. 360/15; 360/16; 360/48; 360/77.08

(58) Field of Classification Search ........................ None
See application file for complete search history.

(56) References Cited

U.S. PATENT DOCUMENTS

| | | | |
|---|---|---|---|
| 4,912,585 A | 3/1990 | Belser et al. | |
| 5,590,009 A | 12/1996 | Ishida | |
| 5,828,536 A * | 10/1998 | Morita | 360/135 |
| 5,907,448 A * | 5/1999 | Watanabe et al. | 360/77.04 |
| 6,602,620 B1 * | 8/2003 | Kikitsu et al. | 428/842.2 |
| 6,654,337 B2 * | 11/2003 | Endoh et al. | 369/275.4 |
| 6,829,201 B2 * | 12/2004 | Nishikawa et al. | 369/13.38 |
| 6,852,431 B2 * | 2/2005 | Fukutani et al. | 428/826 |
| 6,879,458 B2 * | 4/2005 | Sacks et al. | 360/75 |
| 7,167,436 B2 * | 1/2007 | Koyama et al. | 369/275.3 |
| 2001/0028936 A1 * | 10/2001 | Nishiyama et al. | 428/64.3 |

FOREIGN PATENT DOCUMENTS

JP    A 06-195907    7/1994

* cited by examiner

*Primary Examiner*—Hoa T. Nguyen
*Assistant Examiner*—Dismery Mercedes
(74) *Attorney, Agent, or Firm*—Oliff & Berridge, PLC

(57) ABSTRACT

A reliable magnetic recording medium is provided which comprises a servo signal unit portions formed in a concavo-convex shape, easily produced, and resistant to tracking error. Also provided are a magnetic recording/reproducing apparatus which incorporates the magnetic recording medium, and a stamper for manufacturing the magnetic recording medium with efficiency. The magnetic recording medium includes a recording layer divided into a plurality of data areas and a plurality of servo areas to record information. The recording layer is formed in a concavo-convex shape in each servo area, with a servo signal unit portions formed as either a convex portions or a concave portions of the concavo-convex shape. Of the servo signal unit portions, the burst signal unit portion for tracking is generally elliptical in shape when viewed from the direction of thickness.

20 Claims, 7 Drawing Sheets

Position of reproducing head
in the direction of track width

MAGNETIC RECORDING MEDIUM, MAGNETIC RECORDING/REPRODUCING APPARATUS, AND STAMPER FOR MANUFACTURING THE MAGNETIC RECORDING MEDIUM

BACKGROUND OF THE INVENTION

1. Field of the Invention

The present invention relates to a magnetic recording medium having servo signal unit portions formed in a concavo-convex shape, a magnetic recording/reproducing apparatus with the magnetic recording medium, and a stamper for manufacturing the magnetic recording medium.

2. Description of the Related Art

Conventional magnetic recording media such as hard disks have been used with the recording layer divided into a plurality of data areas and a plurality of servo areas. In the servo area, control servo signals such as for positioning a magnetic head are magnetically recorded in a predetermined servo pattern.

The servo area includes a preamble region for clock synchronization, a SAM region for indicating the start of servo data, a track address signal region for indicating the track number, a sector address signal region for indicting the sector number, and a burst signal region for tracking the magnetic head.

In the burst signal region, a number of burst signal unit portions are magnetically recorded in a plurality of types of separate burst signal groups. Each burst signal group includes a plurality of burst signal unit portions which are recorded in rows at appropriate intervals in the length-wise direction of the track (i.e., in the relative direction of travel of the magnetic head). Now, for understanding of the present invention, a more specific description will be made to the configuration and operation of the burst signal unit portion in accordance with an example in which four types of burst signal groups are defined.

First and second burst signal groups are magnetically recorded such that the centers of the burst signal unit portions thereof in the direction of track width are displaced relative to each other by one track pitch in the direction of the track width. Likewise, third and fourth burst signal groups are also magnetically recorded such that the centers of the burst signal unit portions thereof in the direction of track width are displaced relative to each other by one track pitch in the direction of track width. However, relative to the centers of the burst signal unit portions of the first and second burst signal groups in the direction of track width, the centers of the burst signal unit portions of the third and fourth burst signal groups are also displaced by a half of the track pitch in the direction of track width. In the foregoing, a number of each burst signal groups are recorded at intervals of two track pitches in the direction of track width. The positional relation between the aforementioned four types of burst signal groups is that between neighboring four types of burst signal groups.

While traveling along (or relative to) a track on which data is to be recorded or reproduced, the magnetic head detects the outputs from the burst signal unit portions of the first and second burst signal groups corresponding to this track. The differential value between the outputs from the burst signal unit portions of the first and second burst signal groups varies according to the amount of displacement of the magnetic head relative to the track in the direction of track width. Accordingly, based on the differential value, it is possible to compensate for the position of the magnetic head in the direction of track width by knowing the amount of displacement of the magnetic head in the direction of track width relative to the track on which data is to be recorded or reproduced. On the other hand, when only the first and second burst signal groups are not enough to accurately position the magnetic head, it is also possible to use the third and fourth burst signal groups in order to position the magnetic head with improved accuracy.

The arrangement of the burst signal unit portions shown here is only an example in which four types of burst signal groups are defined. In another example, the burst signal unit portions may also be recorded such that the first and second burst signal groups are displaced relative to each other by two-thirds of the track pitch in the direction of track width while the third and fourth burst signal groups are also displaced relative to each other by two-thirds of the track pitch in the direction of track width. Additionally, the third and fourth burst signal groups are displaced relative to the first and second burst signal groups by one-third of the track pitch in the direction of track width. Alternatively, with the third and fourth burst signal groups eliminated, only the first and second burst signal groups may be magnetically recorded. On the other hand, it may also be acceptable to magnetically record six or eight types of burst signal groups.

In general, the servo signal unit portion is recorded by the servo track writing method in a rectangular shape on a magnetic recording medium. At this time, since the magnetic head moves in the radial direction(the direction of track width) along an arcuate path over the magnetic recording medium, the servo signal unit portions are magnetically recorded with the maximum angular difference of about 20 degrees depending on the radial position. However, since the magnetic head also moves along an arcuate path in the radial direction over the magnetic recording medium in the magnetic recording/reproducing apparatus, it is possible to accurately read the output from the servo signal unit portions that have been magnetically recorded with an angular difference depending on the radial position.

However, such a servo signal recording step raised a problem of low productivity because in this step, the servo signal unit portions and their surrounding portions are magnetized in opposite polarities one by one in each magnetic recording medium. Recently, among other things, because of increases in areal density and attendant decreases in flying height of the head, it has been required to record servo information with high density and accuracy. There is thus an increasing need for recording servo information with improved efficiency.

In this context, such a magnetic recording medium has been suggested in which the recording layer is formed only in either each servo signal unit portions or its surrounding portion in the servo area, with a servo pattern formed to have a geometrical feature. With this construction, servo information can be recorded with significantly improved efficiency because the recording layer is magnetized exactly in the servo pattern by uniformly applying a direct-current magnetic field to the magnetic recording medium.

By the way, magnetic recording media such as hard disks have been improved by employing finer magnetic particles forming the recording layer, alternative materials, and finer processing of the head, thereby attaining a significant increase in areal density. Further expectations are also placed on the improvement of areal density. However, these conventional approaches to the improvement of areal density have already reached their limits due to the limited accuracy in processing the magnetic head or recording to a track adjacent to a target track or crosstalk on reproducing operation caused by a spread of the recording magnetic field of the magnetic head. Accordingly, candidates for a magnetic recording medium have been suggested which are capable of attaining further improved areal density. These candidates include a discrete track medium or patterned medium in which the recording layer is formed in a concavo-convex pattern in the data area, with the recording elements formed as a convex portion of the concavo-convex pattern. To manufacture such a discrete track medium or patterned medium, there is a step of processing the recording layer to form a recording elements as a convex portions in the data area. In this step, the servo signal unit portions can also be formed at the same time either as a convex or concave portions in the servo area. This is advantageous especially in terms of productivity (e.g., see Japanese Patent Laid-Open Publication No. Hei 6-195907).

To process the recording layer into a servo pattern or track pattern, a mask layer or a resist layer may be formed on a continuous recording layer, and the servo pattern or track pattern is then formed on the resist layer by lithography or nano-imprint. Subsequently, the mask layer and the recording layer are sequentially processed by dry etching.

However, it was not easy to form a desired servo pattern with accuracy in the resist layer. For example, a concavo-convex shape corresponding to such a complicated servo pattern was not easy to form in the resist layer by lithography, and the concavo-convex shape was thus difficult to form with sufficient accuracy. On the other hand, even in the case of using a stamper, since the stamper is also manufactured by lithography which has a transfer surface of a concavo-convex shape corresponding to that of the recording layer, there was a problem that the concavo-convex shape could not be formed on the stamper with sufficient accuracy. Furthermore, even by dry etching, it was difficult to process the mask layer or the recording layer with accuracy exactly according to the shape of the patterned resist layer. That is, it is not easy to accurately form a rectangular servo signal unit portions as a convex or concave portions exactly in the desired shape. In practice, the servo signal unit portions may be formed in an unintended contour or at an unintended position or angle.

In particular, it is difficult to precisely form the rectangular servo signal unit portions exactly according to a complicated servo pattern, having an angular difference depending on the radial position, corresponding to the arcuate path of the magnetic head of the magnetic recording/reproducing apparatus. Thus, the servo signal unit portions tend to be formed at an unintended angle. As such, the servo signal unit portions disposed at an unintended angle may cause an unallowable angular difference between the servo signal unit portions and the magnetic head, leading to degradation in read accuracy of the servo information and thus resulting in an error.

More specifically, magnetic recording media, such as the discrete track medium and the patterned medium, which have high areal densities, are subject to tracking error due to degradation in accuracy in reading burst signals.

SUMMARY OF THE INVENTION

In view of the foregoing problems, various exemplary embodiments of this invention provide a reliable magnetic recording medium which comprises a servo signal unit portions formed in a concavo-convex shape, easily produced, and resistant to tracking error. Various exemplary embodiments of this invention also provide a magnetic recording/reproducing apparatus which incorporates the magnetic recording medium. Various exemplary embodiments of this invention further provide a stamper for manufacturing the magnetic recording medium.

Various exemplary embodiments of the present invention achieve the aforementioned objects by forming at least a tracking burst signal unit portion of the servo signal unit portion in a generally elliptical shape when viewed from the direction of thickness.

A variation in relative angle between the magnetic head and the burst signal unit portion would cause a change in the burst signal detected by the magnetic head. This is conceivably because of a change in the area of the burst signal unit portion within the signal detection area of the magnetic head. However, a change in the relative angle between the magnetic head and the burst signal unit portion would cause a generally elliptical burst signal unit portion to have a smaller change in area of the burst signal unit portion within the signal detection area of the magnetic head than a rectangular burst signal unit portion, thereby allowing a change in the burst signal to be reduced. In other words, a wide allowable range of the angular difference between the burst signal unit portion and the magnetic head makes it possible for the magnetic head to more certainly detect the burst signal.

For example, suppose that a burst signal unit portion disposed at an unintended angle has caused an angular difference, which would not be allowable for a rectangular burst signal unit portion, between the burst signal unit portion and the magnetic head. Even in this case, the magnetic head can still detect the burst signal with accuracy from the generally elliptical burst signal unit portion. In other words, it is possible to process the burst signal unit portion with a wider allowable range of accuracy, thereby making it easier to manufacture the stamper and process the resist layer, the mask layer, and the recording layer. This allows for improving production efficiency.

Furthermore, for example, when all burst signal unit portions are arranged in a uniform direction to provide burst signal patterns with no angular difference, there would occur an angular difference, corresponding to the skew angle of the magnetic head, between the burst signal unit portion and the magnetic head depending on the radial position on the magnetic recording medium. In this case, it is also possible for the magnetic head to detect the burst signal with accuracy even in the presence of an angular difference, which would not be allowable for a rectangular burst signal unit portion, between the burst signal unit portion and the magnetic head. Additionally, such a simpler burst signal pattern makes it easier to design the burst signal pattern.

Accordingly, various exemplary embodiments of the invention provide a magnetic recording medium comprising a recording layer divided into a plurality of data areas and a plurality of servo areas to record information, wherein the recording layer is formed in a concavo-convex shape in a predetermined servo pattern in each of the servo areas, with a servo signal unit portion formed as either a convex portion or a concave portion of the concavo-convex shape, and at least a burst signal unit portion of the servo signal unit portion for detecting a position of a track in the data area is generally elliptical in shape when viewed from a direction of thickness.

Various exemplary embodiments of the invention provide a magnetic recording/reproducing apparatus comprising the magnetic recording and a magnetic head for recording/reproducing data in close proximity to a surface of the magnetic recording medium.

Various exemplary embodiments of the invention provide a stamper for manufacturing the magnetic recording medium comprising a transfer surface having a concavo-convex shape corresponding to the concavo-convex shape of the recording layer in the magnetic recording medium.

As used herein, the expression that "a recording layer is formed in a concavo-convex shape in a predetermined servo pattern in each servo area" shall mean to include a case where the recording layer is divided into a number of servo signal unit portions in the servo pattern with the servo signal unit portion formed as a convex portion. Also included is a case where the recording layer is formed only in an area around the servo signal unit portion with the servo signal unit portion formed as a concave portion. Further included is a case where the servo signal unit portion is formed as either a convex or concave portion in a continuous recording layer having both the convex and concave portions formed therein.

Furthermore, as used herein, the term "generally elliptical shape" shall mean to include an elliptical shape, as indicated with symbol "A" in FIG. 13, with the major and minor axes different in length from each other. Also included are a perfect circular shape, as indicated with symbol "B" in the figure; an elliptical shape or an oval shape, as indicated with symbol "C" in the figure, which is asymmetric with respect to both or either the major and/or minor axis; and an elongated circular shape, as indicated with symbol "D" in the figure, which has partially straight portions in the perimeter.

Furthermore, as used herein, the term "generally circular shape" shall mean to include a perfect circular shape as well as an elliptical shape with the difference in length between the major and minor axes falling within 5%.

Furthermore, as used herein, the term "magnetic recording medium" shall mean to include not only hard disks, floppy (registered trade mark) disks, or magnetic tapes which employ only magnetism for recording and reading of information but also a magneto-optical recording medium such as a MO (Magneto-optical) disk which employs both magnetism and light in combination, and a heat-assisted recording medium which employs magnetism and heat in combination.

Furthermore, as used herein, the term "concavo-convex shape corresponding to that of the recording layer" shall mean to include both a concavo-convex shape which agrees with that of the recording layer in convex and concave positional relation, and a concavo-convex shape which is opposite to that of the recording layer in convex and concave positional relation.

Furthermore, as used herein, the term "read width Wr of a magnetic head" shall mean a value that is measured by the following steps. That is, first, a magnetic recording medium to be measured is prepared which has a uniform film-like continuous recording layer of the same material and thickness as those of the recording layer of a concavo-convex pattern, and which has the same configuration as that of the original magnetic recording medium except that of the recording layer. Then, as shown in FIG. 14, a recording head applies a recording magnetic field to the continuous recording layer 100 of the measured magnetic recording medium to form a recorded portion which has a track width Tw in the length-wise direction of the track. At this time, the surrounding of the recorded portion is in an alternating-current (AC) neutralized state. Furthermore, at the ends in the direction of the width of the recorded portion, about a quarter of the track width Tw is AC neutralized to form a micro-track 108 which has a width of Tw/2 as shown in FIG. 14. Then, a reproducing head 106 is brought close to the micro-track 108 along the direction of the track width Tw from a position sufficiently far away from the micro-track 108. Then, the reproducing head 106 is moved over the micro-track 108 to a position sufficiently far away from the micro-track 108 on the opposite side. At this time, the relation between the position of the reproducing head 106 relative to the micro-track 108 in the direction of the track width Tw and the reproduced output from the reproducing head 106 is as shown in FIG. 15. As illustrated, there are two points at which the reproduced outputs are half the maximum reproduced output corresponding to both the sides of the micro-track 108. The spacing between these two points of the reproducing head 106 in the direction of the width of the micro-track 108 (i.e., the half-width) is defined as the "read width Wr of the reproducing head 106."

DETAILED DESCRIPTION OF THE PREFERRED EMBODIMENTS

Preferred exemplary embodiments of the present invention will be described in detail, with reference to the drawings.

Figure 1:
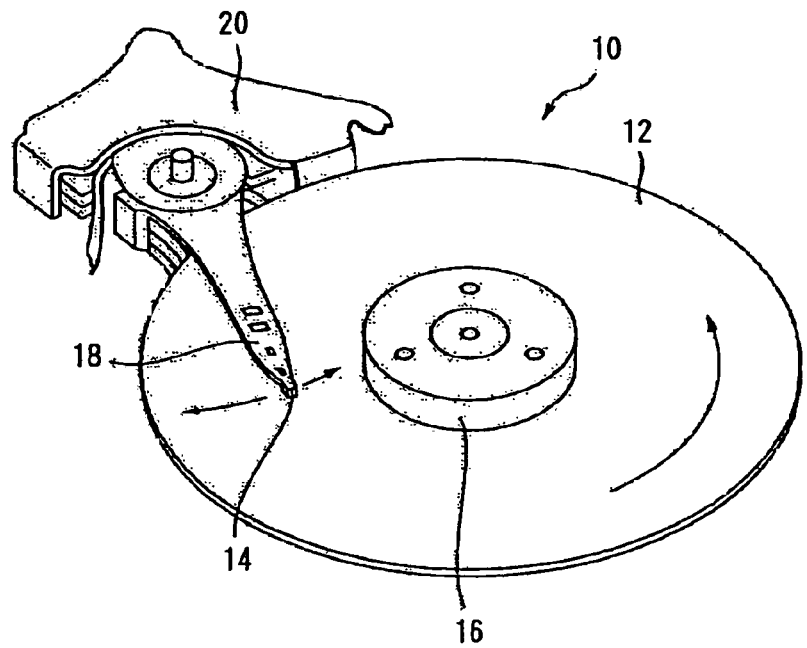
FIG. 1 is a schematic perspective view showing the general configuration of the main portions of a magnetic recording/reproducing apparatus according to a first exemplary embodiment of the present invention.

As shown in FIG. 1, a magnetic recording/reproducing apparatus 10 according to a first exemplary embodiment of the present invention includes a magnetic recording medium 12, and a magnetic head 14 which is capable of flying in close proximity to the surface of the magnetic recording medium 12 for recording data on or reproducing data from the magnetic recording medium 12. The magnetic recording/reproducing apparatus 10 is characterized by the configuration of the magnetic recording medium 12. The configuration of the other parts that is considered unnecessary for the understanding of the present invention is not to be discussed in detail where appropriate.

The magnetic recording medium 12 is fixed to a chuck 16 so as to be rotatable in conjunction with the chuck 16. The magnetic head 14 is mounted on an arm 18 near the tip thereof, the arm 18 being pivotably attached to a base 20. This configuration allows the magnetic head 14 to fly and move over the surface of the magnetic recording medium 12 along an arcuate path in the radial direction of the magnetic recording medium 12.

Figure 2:
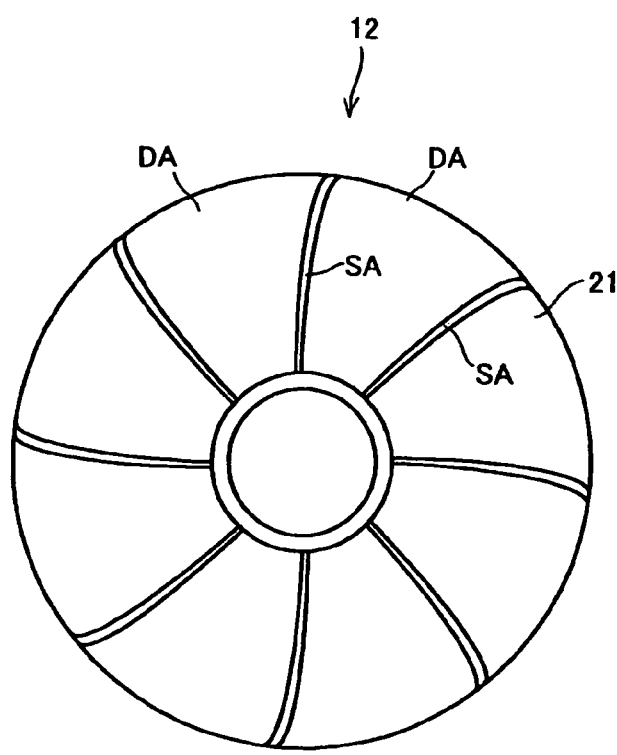
FIG. 2 is a schematic plan view showing the configuration of a magnetic recording medium in the magnetic recording/reproducing apparatus.
Figure 3:
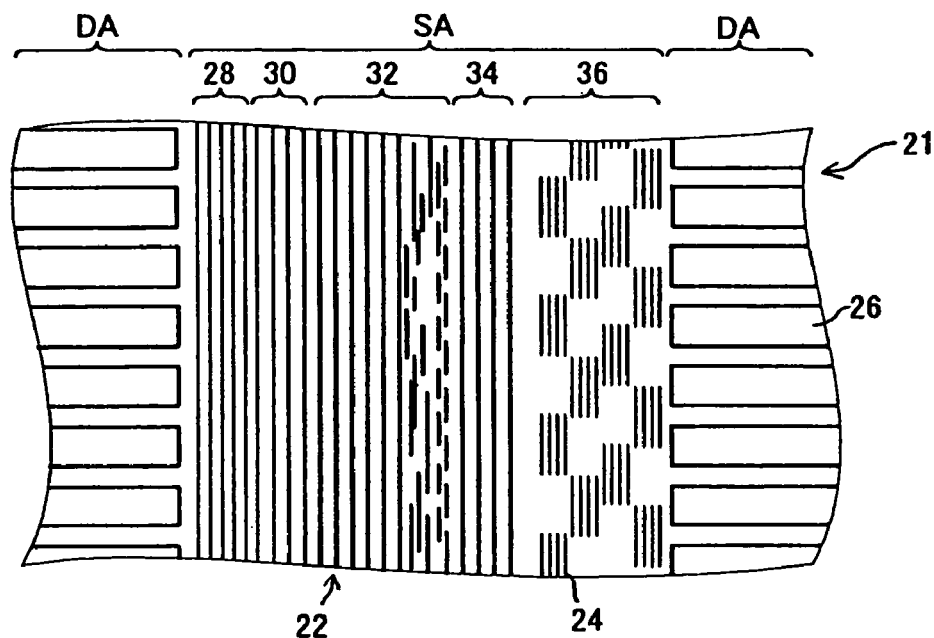
FIG. 3 is an enlarged schematic plan view showing the servo area of the magnetic recording medium.
Figure 4:
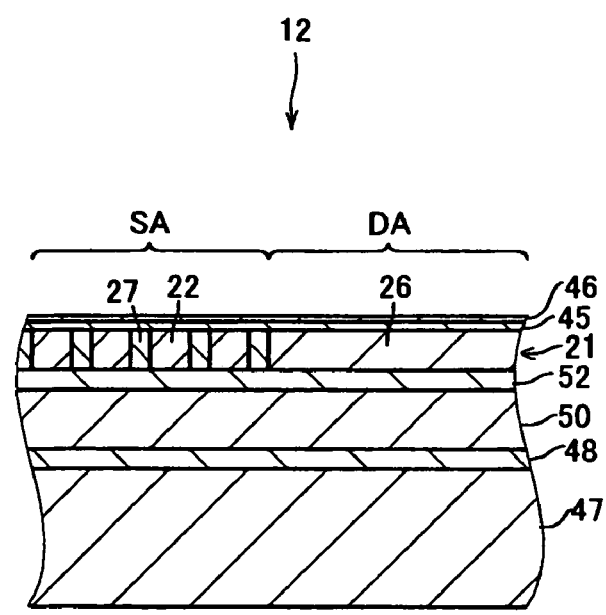
FIG. 4 is an enlarged schematic sectional side view showing the vicinity of the boundary between the servo area and the data area of the magnetic recording medium.

As shown in FIG. 2, the magnetic recording medium 12 is a perpendicular recoding magnetic disk of a discrete track type, includes a recording layer 21 which is divided into a plurality of data areas DA and a plurality of servo areas SA to record information. In each of the servo areas SA, the recording layer 21 is formed in the servo pattern as shown in FIG. 3 and in the concavo-convex shape as shown in FIG. 4. Servo signal unit portions 22 are formed as a convex portions of the concavo-convex shape,. and as shown in FIG. 5, a burst signal unit portions 24 for tracking use in the servo signal unit portions 22 are characterized by being generally elliptical in shape when viewed from the direction of thickness (in a direction perpendicular to the surface of the magnetic recording medium 12).

In each of the data areas DA, the recording layer 21 is divided into concentric arcuate shapes, and a number of recording elements 26 constituting tracks are formed as a convex portions at intervals of track pitch Tp in the radial direction as shown in FIG. 3.

As shown in FIG. 3, each of the servo areas SA is divided into a preamble region 28 for clock synchronization, a SAM (Servo Address Mark) region 30 for indicating the start of servo data, a track address signal region 32 for indicating a track number, a sector address signal region 34 for indicating a sector number, and a burst signal region 36 for detecting the position of the magnetic head at each of the recording elements 26 (track) in a data area DA. In FIG. 3, for convenience sake, the shape of the servo signal unit portions 22 in each portion of the servo area is shown with parallel lines in the direction of the width of the recording elements 26. However, like the burst signal unit portions 24 as shown in FIG. 5, each servo signal unit portion 22 is actually formed as a convex portion which has also a width in the length-wise direction of the recording elements 26 (tracks).

Figure 5:
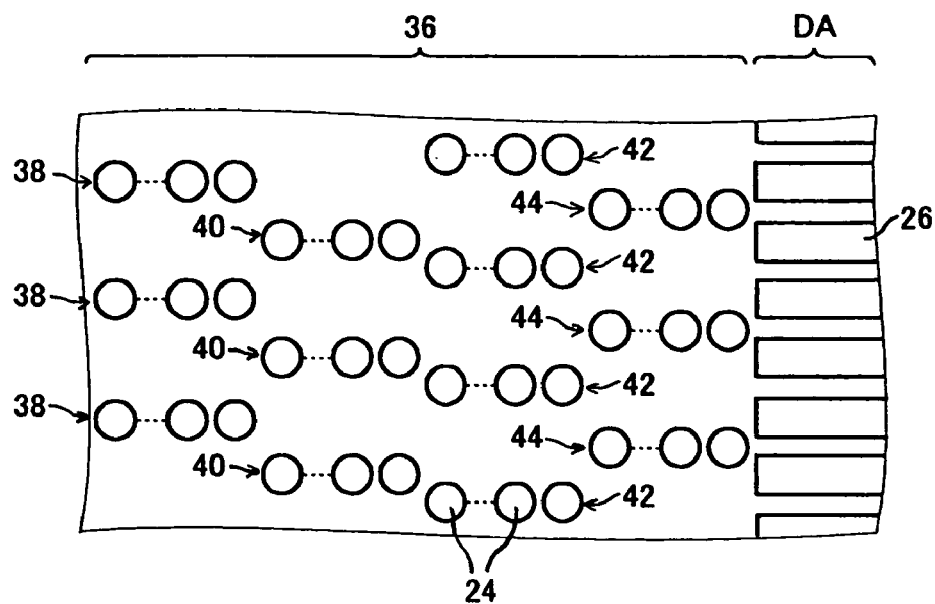
FIG. 5 is an enlarged schematic plan view showing the burst signal region of the magnetic recording medium.
Figure 6:
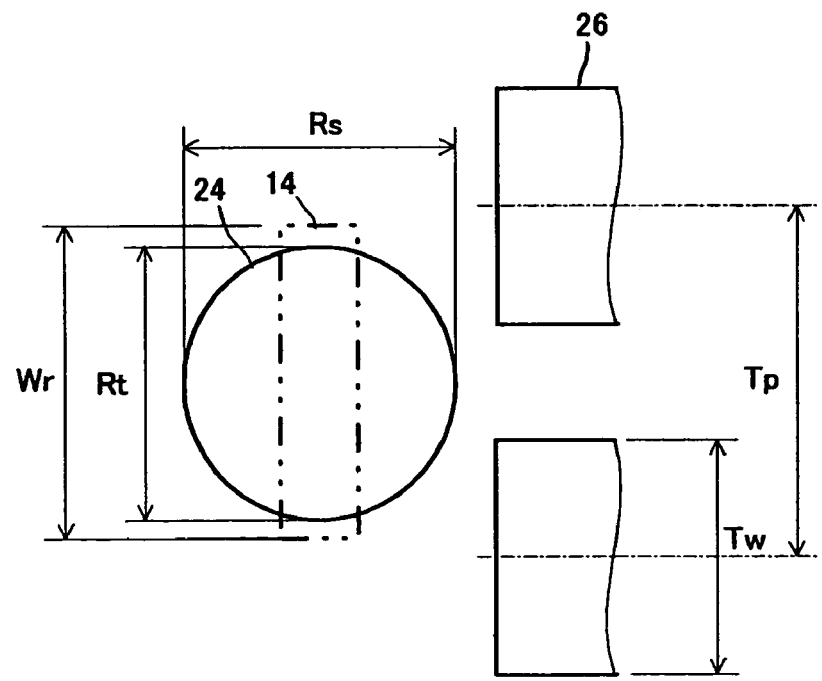
FIG. 6 is a further enlarged schematic plan view showing the shape of the burst signal unit portion of the magnetic recording medium.

As shown in FIG. 5, the burst signal region 36 is provided with a plurality of burst signal unit portions 24 in four types of separate burst signal groups. Each burst signal group has a plurality of burst signal unit portions 24 which are arranged side by side at appropriate intervals in a row in the length-wise direction (in the relative travel direction of the magnetic head 14) of the recording elements 26 (tracks). The burst signal groups are each staggered at appropriate intervals in the length-wise direction of the track as well as in the direction of the track width Tw. More specifically, a first burst signal group 38, a second burst signal group 40, a third burst signal group 42, and a fourth burst signal group 44 are formed in that order in the length-wise direction of the track and staggered in the longitudinal direction of the track. Furthermore, the first burst signal group 38 and the second burst signal group 40 are formed such that the centers of the burst signal unit portions 24 thereof in the direction of the track width Tw are displaced by one track pitch Tp relative to each other in the direction of the track width Tw and aligned with the centers of the recording elements 26 in the direction of the track width Tw. Likewise, the third burst signal group 42 and the fourth burst signal group 44 are formed such that the centers of the burst signal unit portions 24 thereof in the direction of the track width Tw are displaced by one track pitch Tp relative to each other in the direction of the track width Tw. These centers are also arranged so as to be displaced by half the track pitch Tp in the direction of the track width Tw relative to the centers of the burst signal unit portions 24 constituting the first burst signal group 38 and the second burst signal group 40 in the direction of the track width Tw (see FIG. 5). In the foregoing, a number of each burst signal groups are formed at intervals of twice the track pitch Tp in the direction of track width. The positional relation between the aforementioned four types of burst signal groups is that between neighboring four types of burst signal groups.

The recording layer 21 is formed in a thickness of 5 to 30 nm over a substrate 47. The recording layer 21 can be formed of a CoCr-based alloy such as a CoCrPt alloy, an FePt-based alloy, a stacked layers of these alloys, or a material having ferromagnetic particles such as of CoPt contained in matrix in an oxide-based material such as of $SiO_2$. On the other hand, the substrate 47 can be formed of a non-magnetic material such as glass, an Al alloy coated with NiP, Si, or $Al_2O_3$.

A non-magnetic material 27 is filled in the concave portions between the recording elements 26 and between the servo signal unit portions 22. The non-magnetic material 27 can be formed of an oxide such as $SiO_2$, $Al_2O_3$, $TiO_2$, ferrite or the like, a nitride such as AlN, or a carbide such as SiC.

Over the recording elements 26 and the servo signal unit portions 22, there are formed a protective layer 45 and a lubricating layer 46 in that order. The protective layer 45 is 1 to 5 nm in thickness. For example, the protective layer 45 can be formed of hard carbon film called "diamond-like carbon."

The lubricating layer 46 is 1 to 2 nm in thickness. The lubricating layer 46 can be formed of fluorine containing lubricant such as PFPE (perfluoro polyether) or the like.

Between the substrate 47 and the recording layer 21 are formed an anti-ferromagnetic layer 48, a soft magnetic layer 50, and a seed layer 52 for providing magnetic anisotropy to the recording layer 21 in the direction of thickness (in a direction perpendicular to the surface). The anti-ferromagnetic layer 48 is 5 to 50 nm in thickness. The anti-ferromagnetic layer 48 can be formed of a PtMn alloy, an RuMn alloy or the like. The soft magnetic layer 50 is 50 to 300 nm in thickness. The soft magnetic layer 50 can be formed of an Fe (iron) alloy, a Co (Cobalt) amorphous alloy, ferrite or the like. The seed layer 52 is 2 to 40 nm in thickness. The seed layer 52 can be formed specifically of a non-magnetic CoCr alloy, Ti, Ru, stacked layers of Ru and Ta, MgO or the like.

The magnetic head 14 includes a recording head and a reproducing head (both not shown).

Now, a description is made to the operation of the magnetic recording/reproducing apparatus 10.

Figure 7:
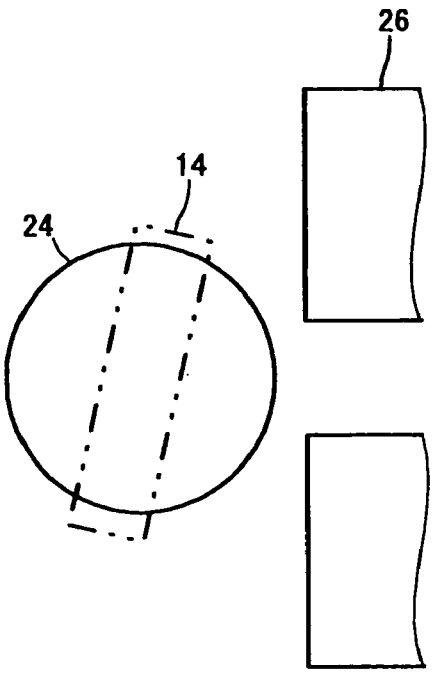
FIG. 7 is a plan view showing the operation of the magnetic recording/reproducing apparatus.

In the magnetic recording/reproducing apparatus 10, no angular difference will occur between the burst signal unit portion 24 and the magnetic head 14 because the burst signal unit portion 24 formed in a convex shape in the servo area SA of the magnetic recording medium 12 is generally circular in shape. For example, even when the burst signal unit portions 24 are processed with low accuracy, the magnetic head 14 can positively detect a burst signal without any angular difference occurring between the burst signal unit portions 24 and the magnetic head 14. Furthermore, even when the magnetic head 14 travels radially with a change in skew angle of the magnetic head 14 as shown in FIG. 7, the magnetic head 14 can positively detect a burst signal without any angular difference occurring between the burst signal unit portion 24 and the magnetic head 14.

In other words, the magnetic recording medium 12 allows the burst signal unit portions 24 to be processed with a wider allowable range of accuracy and therefore produced with improved efficiency. Furthermore, since the angle at which the burst signal unit portion 24 are placed needs not to be taken into account in the design step, the burst signal pattern can be readily designed.

Furthermore, the magnetic recording medium 12 is a discrete track medium with the recording elements 26 formed as a convex shape in the data area, and thus can be produced with improved efficiency in that the servo signal unit portions 22 including the burst signal unit portions 24 and the recording elements 26 can be formed at the same time.

Furthermore, the recording elements 26 are formed in the shape of tracks in the data areas. Thus, the magnetic recording medium 12 having a high areal density would be still resistant to recording to track adjacent to target track and crosstalk on reproducing.

Furthermore, the magnetic recording medium 12 has the recording elements 26 separated from each other without any recording layer 21 present in the concave portion between the recording elements 26, thus providing good recording and reproducing characteristics in that no noise occurs from the concave portion.

Now, a brief description will be made to the method of manufacturing the magnetic recording medium 12.

Figure 11:
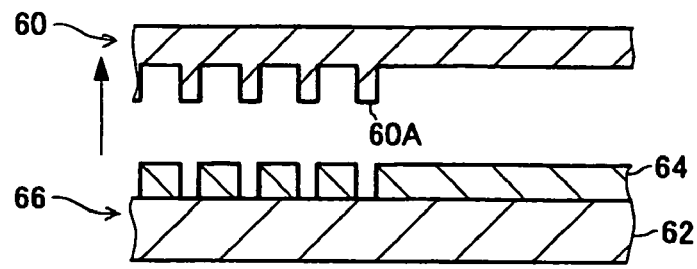
FIG. 11 is a sectional side view showing the outline of a step of manufacturing a stamper for manufacturing the magnetic recording medium according to the first exemplary embodiment of the present invention.

As shown in FIG. 11, manufactured first is a stamper 60 for manufacturing the magnetic recording medium 12 for processing the recording layer 21 of the magnetic recording medium 12 into the aforementioned concavo-convex shape. The stamper 60 has a transfer surface 60A formed in a concavo-convex shape corresponding to that of the recording layer 21. More specifically, a resist material 64 is first applied onto a substrate 62 such as of Si. Then, the resist material 64 is removed partially through exposure and development by lithography to have a concavo-convex shape that agrees with that of the recording layer 21 in convex and concave positional relation. In this manner, a master disk 66 is manufactured. Since the burst signal unit portions 24 are generally circular in shape and thus no consideration is required for the angle of their placement, the burst signal pattern can be easily designed. Furthermore, the burst signal unit portion can be processed with a wide allowable range of accuracy. Accordingly, this makes it easier to manufacture the master disk 66. Then, an electrically conductive film (not shown) is deposited on the concavo-convex shaped master disk 66 by evaporation, sputtering or the like. Thereafter, using the electrically conductive film as an electrode, an electroplated layer such as of Ni (nickel) is formed by electroplating. These electrically conductive film and electroplated layer are then removed in one piece from the master disk, thereby providing the stamper 60 for manufacturing the magnetic recording medium 12 which has the transfer surface 60A of a concavo-convex shape being opposite to that of the recording layer 21 in convex and concave positional relation.

Figure 12:
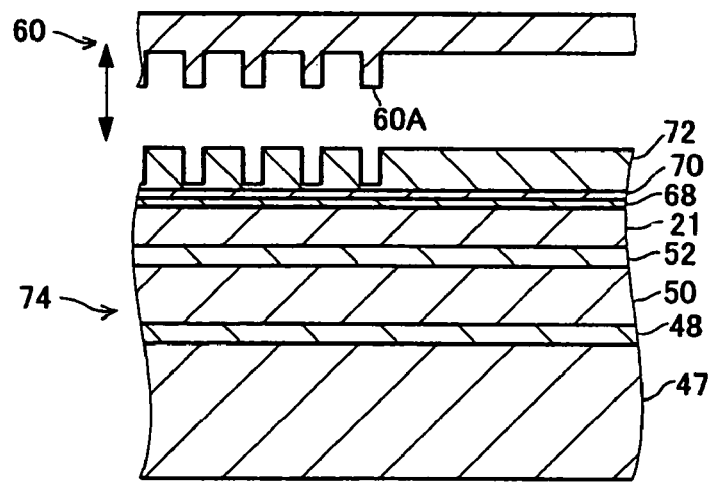
FIG. 12 is a sectional side view showing the outline of a step of transferring a concavo-convex pattern to the resist layer of an object to be processed using the stamper.
Figure 13:
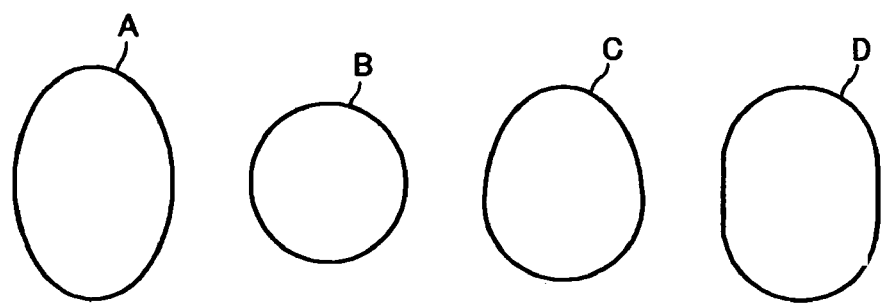
FIG. 13 is a plan view showing examples of a generally elliptical shape in the present application.
Figure 14:
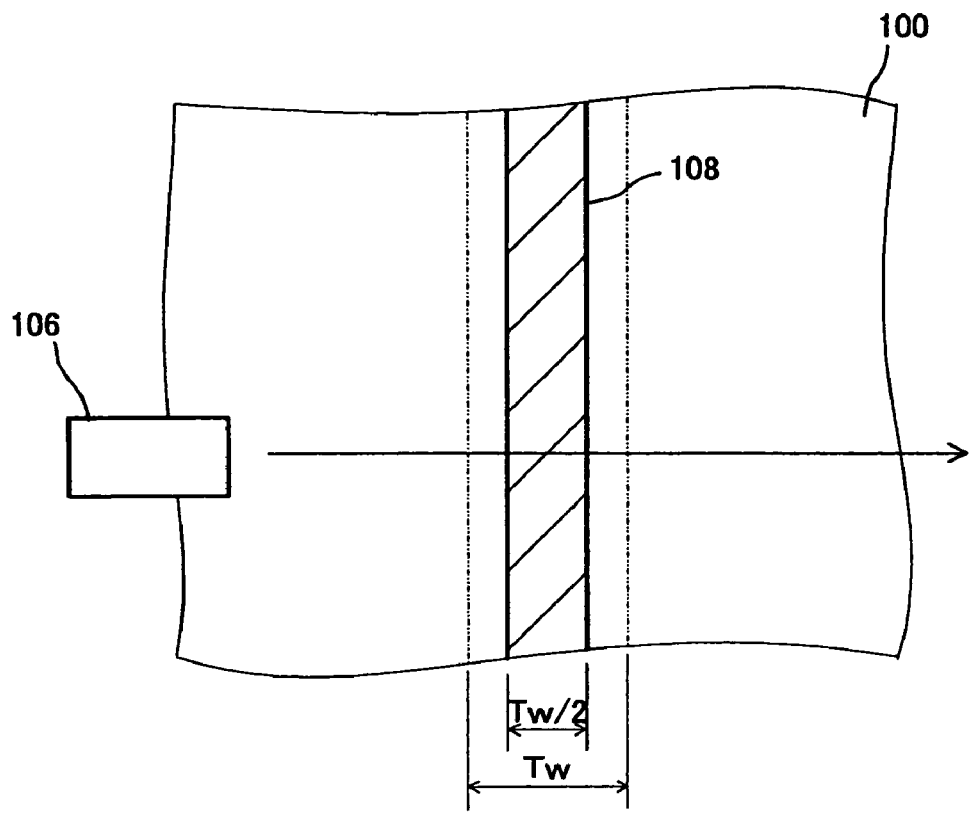
FIG. 14 is an explanatory plan view showing a method of measuring the read width of a magnetic head in the present application.
Figure 15:
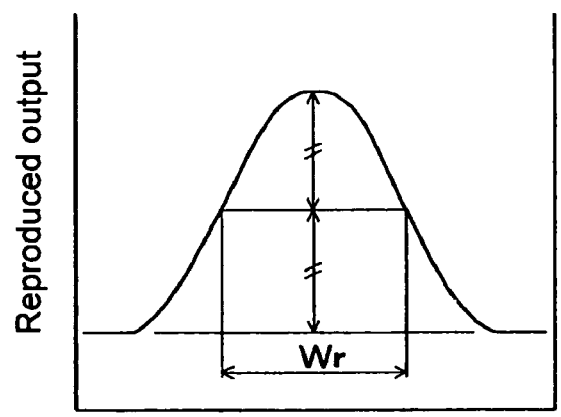
FIG. 15 is an explanatory graph showing a method of measuring the read width of the magnetic head.

Then, prepared is an object to be processed 74 having the substrate 47 over which the anti-ferromagnetic layer 48, the soft magnetic layer 50, the seed layer 52, the continuous recording layer 21, a first mask layer 68, a second mask layer 70, and a resist layer 72 are formed in that order. As shown in FIG. 12, the stamper 60 for manufacturing the magnetic recording medium 12 is brought into contact with the resist layer 72 to transfer the concavo-convex shape of the transfer surface 60A to the resist layer 72. This allows the resist layer. 72 to be processed into a concavo-convex shape that agrees with that of the recording layer 21 in convex and concave positional relation. For example, the first mask layer 68 can be formed of C (carbon). On the other hand, the second mask layer 70 can be formed of Ni, for example. At this stage, the resist layer 72 is uniformly etched by reactive ion etching using an $O_2$ or $O_3$ gas to such an extent that the portion constituting the bottom of the concave portion of the resist layer 72 is removed, thereby exposing the second mask layer 70 on the concave bottom portion.

Then, the second mask layer 70 under the concave bottom portion is removed by ion beam etching using Ar gas, and the first mask layer 68 under the concave bottom portion is removed by reactive ion etching using $SF_6$ gas. The recording layer 21 under the concave bottom portion is further removed by ion beam etching using Ar gas. The recording layer 21 is thus divided into a number of servo signal unit portions 22 and recording elements 26.

Then, the non-magnetic material 27 is deposited on the recording layer 21 by biased sputtering to fill in the concave portion. Additionally, Ar gas is irradiated to the surface of the object to be processed 74 at an oblique angle to remove excessive non-magnetic material 27 by ion beam etching, thereby allowing the surface to be flattened.

Then, the protective layer 45 is deposited by CVD on the upper surface of the servo signal unit portions 22, the recording elements 26, and the non-magnetic material 27. The lubricating layer 46 is further applied on the protective layer 45 by dipping. In this manner, the magnetic recording medium 12 is completed.

As such, since the magnetic recording medium 12 has the burst signal unit portions 24 that are generally circular in shape, the stamper 60 for manufacturing the magnetic recording medium 12 used for the manufacturing steps can be easily manufactured. Furthermore, the stamper 60 for manufacturing the magnetic recording medium 12 can be used to efficiently process the resist layer 72 into the concavo-convex shape that agrees with that of the recording layer 21 in convex and concave positional relation. Furthermore, since the burst signal unit portions 24 are generally circular in shape, a wide range of accuracy is allowed for processing the second mask layer 70, the first mask layer 68, and the recording layer 21. Accordingly, the production efficiency is improved in the entire manufacturing process of the magnetic recording medium 12 including the manufacturing of the stamper 60 for manufacturing the magnetic recording medium 12.

In the first exemplary embodiment, the concavo-convex shape of the transfer surface 60A of the stamper 60 for manufacturing the magnetic recording medium 12 is opposite to that of the recording layer 21 in convex and concave positional relation. However, it is also acceptable to employ a stamper for manufacturing the magnetic recording medium having a concavo-convex shape which agrees with that of the recording layer 21 in convex and concave positional relation. In this case, a concavo-convex shape which is opposite to that of the recording layer 21 in convex and concave positional relation is transferred to the resist layer 72. However, for example, a second resist layer of a material different from that of the resist layer 72 may also be deposited on the resist layer 72 having the concavo-convex shape transferred thereto, such that the portion on the concave portion of the resist layer 72 has a greater thickness than that on the convex portion. Both the resist layers are then etched by an etching method for etching the resist layer 72 at a higher etching rate than for etching the second resist layer. This makes it possible to process the second resist layer into a concavo-convex shape that agrees with that of the recording layer 21 in convex and concave positional relation. Alternatively, the resist layer 72 may be directly formed on the recording layer 21, and the portion that constitutes the concave bottom portion of the resist layer 72 to which the concavo-convex shape has been transferred may be removed by etching. Thereafter, the first mask layer 68 is deposited, except the sides of the remaining convex portion of the resist layer 72, in a uniform thickness on the convex portions of the resist layer 72 and the concave portions therebetween. Then, using a solvent or the like which does not dissolve the first mask layer 68 but selectively dissolves only the resist layer 72, the resist layer 72 constituting the convex portion may be removed in conjunction with the first mask layer 68 deposited thereon. This makes it possible to form the first mask layer 68 in a concavo-convex shape that agrees with that of the recording layer 21 in convex and concave positional relation. In this case, the second mask layer 70 is not required.

Figure 8:
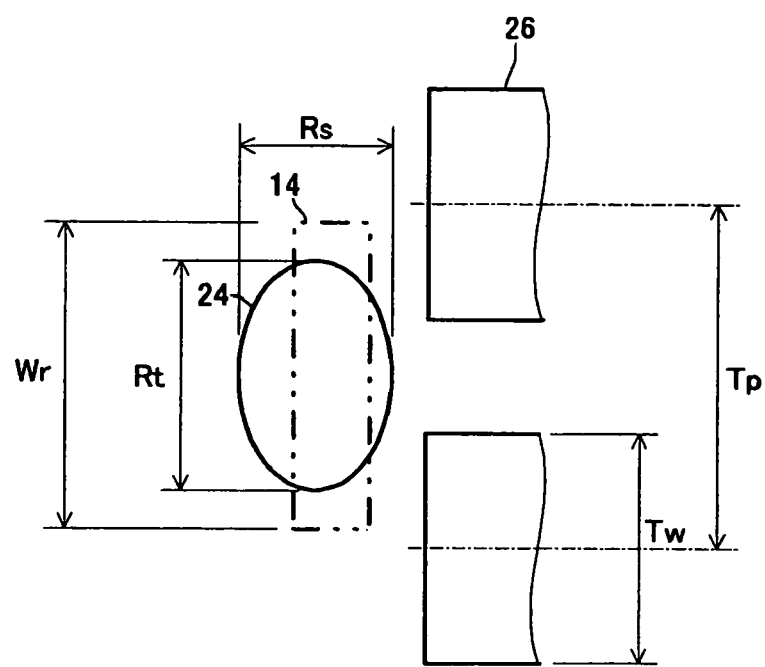
FIG. 8 is a schematic plan view showing the shape of the burst signal unit portion in a magnetic recording medium according to a second exemplary embodiment of the present invention.

In the first exemplary embodiment, the magnetic recording medium 12 has the burst signal unit portions 24 that are generally circular in shape. However, as in a second exemplary embodiment of the present invention shown in FIG. 8, the burst signal unit portion 24 may also be formed in a generally elliptical shape such that its circumferential width Rs (in the longitudinal direction of the track) is less than its radial width Rt (in the direction of the track width Tw), i.e., 1<Rt/Rs. In this case, to obtain good tracking characteristics, preferably Rt/Rs$\leq$2, and more preferably Rt/Rs$\leq$1.5.

As such, the angular difference between the burst signal unit portion 24 and the magnetic head 14 has a wider allowable range even for the burst signal unit portions 24 being generally elliptical (not generally circular) in shape than for the burst signal unit portion being rectangular in shape. Accordingly, the magnetic head 14 can more positively detect a burst signal.

For example, suppose that the burst signal unit portion 24 is placed at an unintended angle, thereby even when such a large angular difference as could not be allowed for the burst signal unit portion being rectangular in shape to occur between the burst signal unit portion 24 and the magnetic head 14, the magnetic head 14 can still detect the burst signal with accuracy. That is, the burst signal unit portions 24 can be processed with a wide allowable range of accuracy, thereby allowing the production efficiency to be improved.

Moreover, for example, suppose that all the burst signal unit portions 24 are arranged in a uniform direction to form burst signal patterns with no angular difference, which may cause an angular difference to occur, corresponding to the skew angle of the magnetic head 14, between the burst signal unit portion 24 and the magnetic head 14 depending on the radial position over the magnetic recording medium 12. In this case, even when such a large angular difference as could not be allowed for the burst signal unit portion being rectangular in shape occurs between the burst signal unit portion 24 and the magnetic head 14, the magnetic head 14 can still detect the burst signal with accuracy. Additionally, employing such a comparatively simple burst signal pattern facilitates its design.

Furthermore, since the burst signal unit portion 24 is shorter in the circumferential direction than in the radial direction, a larger number of burst signal unit portions 24 can be placed in the circumferential direction (in the longitudinal direction of the track). This configuration makes it possible to obtain a larger number of burst signals, and thus perform tracking with further improved accuracy.

Figure 9:
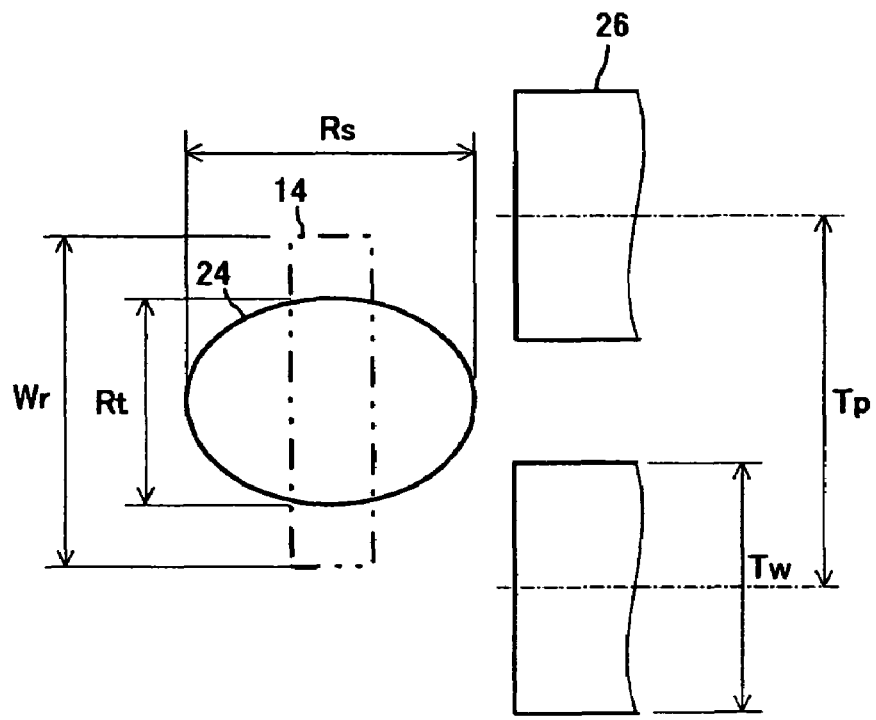
FIG. 9 is a schematic plan view showing the shape of the burst signal unit portion in a magnetic recording medium according to a third exemplary embodiment of the present invention.

On the other hand, as in a third exemplary embodiment of the present invention shown in FIG. 9, it is also acceptable that the burst signal unit portion 24 is shorter in the radial direction than in the circumferential direction, i.e., Rt/Rs<1.

This configuration allows a larger number of burst signal unit portions 24 to be placed in the radial direction. Even with a high areal density and a small track pitch Tp, the burst signal unit portions 24 can be placed at desired positions. In this case, to obtain good tracking characteristics, preferably 0.5$\leq$Rt/Rs, and more preferably 0.7$\leq$Rt/Rs.

Figure 10:
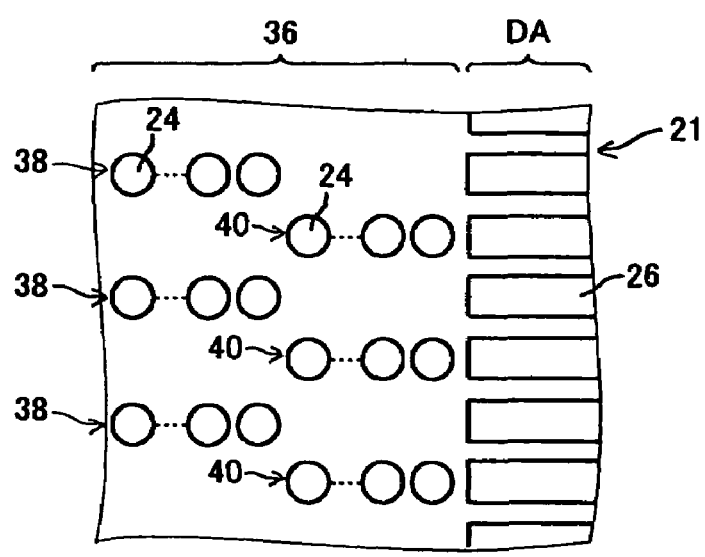
FIG. 10 is an enlarged schematic plan view showing the burst signal region in a magnetic recording medium according to a fourth exemplary embodiment of the present invention.

In the aforementioned magnetic recording medium 12 according to the first exemplary embodiment, the burst signal region 36 has a plurality of burst signal unit portions 24 which are placed in four types of separate burst signal groups. However, for example, suppose that the areal density is relatively low and the required tracking accuracy is also relatively low. In this case, as in a fourth exemplary embodiment of the present invention shown in FIG. 10, the third and fourth burst signal groups may be eliminated. In other words, a plurality of burst signal unit portions 24 may be divided into two types of burst signal groups, i.e., the first burst signal group 38 and the second burst signal group 40, to be placed in the burst signal region 36. In this case, as in the aforementioned second and third exemplary embodiments, the burst signal unit portion 24 may be generally elliptical in shape.

On the other hand, for example, in the case where the areal density is comparatively high and the required tracking accuracy is also comparatively high, a plurality of burst signal unit portions may be placed in six types or eight types of separate burst signal groups.

In the aforementioned first exemplary embodiment, the first burst signal group 38 and the second burst signal group 40 are formed such that the centers of the burst signal unit portions thereof in the direction of the track width Tw are displaced by one track pitch Tp relative to each other in the direction of the track width Tw. Likewise, the third burst signal group 42 and the fourth burst signal group 44 are formed such that the centers of the burst signal unit portions thereof in the direction of the track width Tw are displaced by one track pitch Tp relative to each other in the direction of the track width Tw. The centers are also arranged so as to be displaced by half the track pitch Tp in the direction of the track width Tw relative to those of the first burst signal group 38 and the second burst signal group 40 in the direction of the track width Tw. However, the amount of interval of the burst signal groups relative to each other in the direction of the track width Tw may be defined as appropriate according to the performance required or the like. For example, the first burst signal group 38 and the second burst signal group 40 may be formed such that the centers of the burst signal unit portions thereof in the direction of the track width Tw are displaced by two-thirds of the track pitch Tp relative to each other in the direction of the track width Tw. Likewise, the third burst signal group 42 and the fourth burst signal group 44 may be formed such that the centers of the burst signal unit portions thereof in the direction of the track width Tw are displaced by two-thirds of the track pitch Tp relative to each other in the direction of the track width Tw. The centers may also be arranged so as to be displaced by one-third of the track pitch Tp in the direction of the track width Tw relative to those of the first burst signal group 38 and the second burst signal group 40.

In the magnetic recording medium 12 according to the aforementioned first to fourth exemplary embodiments, the burst signal unit portions 24 are formed as a convex portions. However, the burst signal unit portions having a generally elliptical shape including a generally circular shape may also be formed as a concave portions. Even in this case, the burst signal can be detected with improved accuracy and the production efficiency can be improved.

Furthermore, the magnetic recording medium 12 according to the aforementioned first to fourth exemplary embodiments is a discrete track medium in which the recording layer 21 is divided into a number of recording elements 26 at fine intervals in the radial direction in the data area DA. However, the magnetic recording medium may also be a patterned medium in which the recording layer is divided into a number of recording elements at fine intervals in the radial and circumferential directions in the data area DA, or a magnetic recording medium having a continuous recording layer formed in the data area DA. Even in this case, the burst signal unit portions 24 having a generally elliptical shape including a generally circular shape may also be formed as a concave or convex portions, thereby allowing the burst signal to be detected with improved accuracy and the production efficiency to be improved.

Incidentally, "the longitudinal direction of the track" shall mean the direction along which the magnetic head travels relatively. In the case of the discrete track medium where the recording elements 26 are formed in the shape of tracks, the longitudinal direction of the recording elements 26 is that of the track. However, in the case of the patterned medium where the recording elements are formed in the shape of tracks being divided in their longitudinal direction, the longitudinal direction of the recording elements does not always agree with that of the tracks.

In the aforementioned first to fourth exemplary embodiments, the magnetic recording medium 12 is of a perpendicular recording type. However, also in a case of a magnetic recording medium of a longitudinal recording type, the burst signal unit portion 24 having a generally elliptical shape including a generally circular shape may also be formed as a concave or convex portion, thereby allowing the burst signal to be detected with improved accuracy and the production efficiency to be improved.

WORKING EXAMPLE

Twenty types of magnetic recording/reproducing apparatuses 10 were prepared which had the burst signal unit portions 24, generally elliptical in shape, formed in four types of separate burst signal groups, the apparatuses having different relations therebetween in the shape Rt/Rs of the burst signal unit portion 24 and the read width Wr of the magnetic head 14. The major configurations of these magnetic recording/reproducing apparatuses 10 are shown in Table 1.

In all the magnetic recording/reproducing apparatuses 10, the recording layer 21 of the magnetic recording medium 12 has a fixed thickness of approximately 15 nm, and the burst signal unit portions 24 also have a fixed radial width Rt of approximately 200 nm. A measurement of the magnetic property of the recording layer 21 performed using a vibrating sample magnetometer (VSM) showed that the saturation magnetization Ms was approximately 350 emu/cc and the remanent magnetization Mr was approximately 340 emu/cc.

Furthermore, in any one of the magnetic recording media 12, the burst signal pattern was configured such that all the burst signal unit portions 24 were placed in a uniform direction so as to have a minor axis or a major axis disposed parallel to the radial direction without any angular difference.

In these magnetic recording/reproducing apparatuses 10, the skew angle of the magnetic head 14 was changed relative to the longitudinal direction of the tracks, thereby causing a change in the angular difference between the burst signal unit portions 24 and the magnetic head 14. Then, the differential values between outputs from the burst signal unit portions 24 of the first and second burst signal groups 38 and 40 and the differential values between outputs from the burst signal unit portions 24 of the third and fourth burst signal groups 42 and 44 were selectively employed to obtain a PES (Position Error Signal) signal and then measure a variation in the PES signal. Here, the angular difference between the burst signal unit portion 24 and the magnetic head 14 is equal to the skew angle of the magnetic head 14. Depending on the position of the magnetic head 14, there exists either a region of high measurement accuracy where the differential value varies linearly with changes in the position of the magnetic head 14 or a region of low measurement accuracy where the differential value does not vary linearly. A region of low measurement accuracy for one differential value is a region of high measurement accuracy for the other differential value. Depending on the position of the magnetic head 14, one of the two differential values obtained with high measurement accuracy is selected to calculate the PES signal. In some cases, depending on the condition, there may exist a region where both the differential values do not vary linearly. However, even in such a case, one of both the differential values obtained with higher measurement accuracy is selected to calculate the PES signal. The measurement results are also shown in Table 1.

TABLE 1

| | | | Variations in differential value of burst signals (dB) | | |
|---|---|---|---|---|---|
| Configuration of the magnetic recording/reproducing apparatus | | | Skew angle 5 deg. | Skew angle 10 deg. | Skew angle 20 deg. |
| Working example | Rt/Rs = 0.5 | Wr = 0.6 Rt | 0.0 | −0.2 | −0.3 |
| | | Wr = 0.8 Rt | 0.0 | −0.2 | −0.3 |
| | | Wr = 1.0 Rt | 0.0 | −0.2 | −0.3 |
| | | Wr = 1.2 Rt | 0.0 | −0.2 | −0.3 |
| | Rt/Rs = 0.7 | Wr = 0.6 Rt | 0.0 | 0.0 | 0.0 |
| | | Wr = 0.8 Rt | 0.0 | 0.0 | 0.0 |
| | | Wr = 1.0 Rt | 0.0 | 0.0 | 0.0 |
| | | Wr = 1.2 Rt | 0.0 | 0.0 | 0.0 |
| | Rt/Rs = 1.0 | Wr = 0.6 Rt | 0.0 | 0.0 | 0.0 |
| | | Wr = 0.8 Rt | 0.0 | 0.0 | 0.0 |
| | | Wr = 1.0 Rt | 0.0 | 0.0 | 0.0 |
| | | Wr = 1.2 Rt | 0.0 | 0.0 | 0.0 |
| | Rt/Rs = 1.5 | Wr = 0.6 Rt | 0.0 | 0.0 | 0.0 |
| | | Wr = 0.8 Rt | 0.0 | 0.0 | 0.0 |

TABLE 1-continued

| Configuration of the magnetic recording/reproducing apparatus | | | Variations in differential value of burst signals (dB) | | |
|---|---|---|---|---|---|
| | | | Skew angle 5 deg. | Skew angle 10 deg. | Skew angle 20 deg. |
| | | Wr = 1.0 Rt | 0.0 | 0.0 | 0.0 |
| | | Wr = 1.2 Rt | 0.0 | 0.0 | 0.0 |
| | Rt/Rs = 2.0 | Wr = 0.6 Rt | 0.0 | −0.2 | −0.3 |
| | | Wr = 0.8 Rt | 0.0 | −0.2 | −0.3 |
| | | Wr = 1.0 Rt | 0.0 | −0.2 | −0.3 |
| | | Wr = 1.2 Rt | 0.0 | −0.2 | −0.3 |
| Comparative example | Rt/Rs = 1.0 | Wr = 0.6 Rt | 0.0 | −0.3 | −0.4 |
| | | Wr = 0.8 Rt | 0.0 | −0.3 | −0.4 |
| | | Wr = 1.0 Rt | 0.0 | −0.4 | −0.6 |
| | | Wr = 1.2 Rt | 0.0 | −0.3 | −0.4 |

COMPARATIVE EXAMPLE

To compare with the working examples, prepared were four types of magnetic recording/reproducing apparatuses which had burst signal unit portions formed in a generally square shape with one side approximately 200 nm. As in the working examples, variations in the PES signal were measured. The configurations of the magnetic recording/reproducing apparatuses, except the shape of the burst signal unit portions, are the same as those of the working examples.

As shown in Table 1, in all the working examples including the one having a skew angle of 20 degrees (the angular difference between the burst signal unit portion 24 and the magnetic head 14), the variations in the PES signal were greater than or equal to −0.3 dB (0.3 or less in absolute value). Thus, the variations in the PES signal were suppressed to a level at which no problem occurred in practical use. In all the cases of Rt/Rs being 0.7, 1.0, and 1.5 including the case of the skew angle of 20 degrees, the variation in the PES signal was 0.0 dB.

That is, Table 1 shows that with $0.5 \leq Rt/Rs \leq 2$, the variation in the PES signal resulting from the angular difference between the burst signal unit portion 24 and the magnetic head 14 can be suppressed within a range in which no problem occurs in practical use. It is also shown that with $0.7 \leq Rt/Rs \leq 1.5$, the variation in the PES signal can be suppressed to substantially zero.

On the other hand, in the comparative examples, with the skew angle being 5 degrees, the variation in the PES signal was zero; however, with the skew angle being 10 degrees or greater, the variation in the PES signal would be below −0.3 dB (greater than 0.3 in absolute value).

That is, it was confirmed that when compared with the burst signal unit portion being generally rectangular in shape, the burst signal unit portion 24 being generally elliptical in shape could suppress the variation in the PES signal caused by the angular difference between the burst signal unit portion 24 and the magnetic head.

What is claimed is:

1. A magnetic recording medium comprising a recording layer divided into a plurality of data areas and a plurality of servo areas to record information, wherein
   each of the servo areas has a burst signal region for detecting a position of a magnetic head at each track in the data areas,
   the burst signal region is provided with burst signal groups each of which is longer in a length-wise direction of the track than in a width direction of the track,
   the recording layer is formed in a concavo-convex shape in a predetermined servo pattern in each of the servo areas, with servo signal unit portions formed as either convex portions or concave portions of the concavo-convex shape,
   a plurality of burst signal unit portions of the servo signal unit portions are arranged side by side in a row in the length-wise direction of the track in each of the burst signal groups,
   at least the burst signal unit portions of the servo signal unit portions are generally elliptical in shape when viewed from a direction of thickness, and
   the burst signal unit portions are configured such that $1 < Rt/Rs \leq 2$ is satisfied, where Rt is a width in the width direction of the track, and Rs is a width in the length-wise direction of the track.

2. The magnetic recording medium according to claim 1, wherein
   the burst signal unit portions are configured such that $1 < Rt/Rs \leq 1.5$ is satisfied.

3. The magnetic recording medium according to claim 2, wherein
   all other portion surrounding the burst signal unit portions, in the burst signal region, in each of the servo areas, is formed as either a single concave portion or a single convex portion of the concavo-convex shape of the recording layer, of which concavo-convex direction is opposite to that of the burst signal unit portions.

4. The magnetic recording medium according to claim 3, wherein
   the burst signal unit portions are formed as the concave portions.

5. The magnetic recording medium according to claim 2, wherein
   the burst signal unit portions are formed as the concave portions.

6. A magnetic recording/reproducing apparatus comprising
   the magnetic recording medium according to claim 1, and
   the magnetic head for recording/reproducing data in close proximity to a surface of the magnetic recording medium.

7. A stamper for manufacturing the magnetic recording medium according to claim 1 comprising
   a transfer surface having a concavo-convex shape corresponding to the concavo-convex shape of the recording layer in the magnetic recording medium.

8. The magnetic recording medium according to claim 1, wherein all other portion surrounding the burst signal unit portions, in the burst signal region, in each of the servo areas, is formed as either a single concave portion or a single convex portion of the concavo-convex shape of the recording layer, of which concavo-convex direction is opposite to that of the burst signal unit portions.

9. The magnetic recording medium according to claim 8, wherein
the burst signal unit portions are formed as the concave portions.

10. The magnetic recording medium according to claim 1, wherein
the burst signal unit portions are formed as the concave portions.

11. A magnetic recording medium comprising a recording layer divided into a plurality of data areas and a plurality of servo areas to record information, wherein
each of the servo areas has a burst signal region for detecting a position of a magnetic head at each track in the data areas,
the burst signal region is provided with burst signal groups each of which is longer in a length-wise direction of the track than in a width direction of the track,
the recording layer is formed in a concavo-convex shape in a predetermined servo pattern in each of the servo areas, with servo signal unit portions formed as either convex portions or concave portions of the concavo-convex shape,
a plurality of burst signal unit portions of the servo signal unit portions are arranged side by side in a row in the length-wise direction of the track in each of the burst signal groups,
at least the burst signal unit portions of the servo signal unit portions are generally elliptical in shape when viewed from a direction of thickness, and
the burst signal unit portions are configured such that $0.5 \leq Rt/Rs < 1$ is satisfied, where Rt is a width in the width direction of the track, and Rs is a width in the length-wise direction of the track.

12. The magnetic recording medium according to claim 11, wherein
the burst signal unit portions are configured such that $0.7 \leq Rt/Rs < 1$ is satisfied.

13. The magnetic recording medium according to claim 12, wherein
all other portion surrounding the burst signal unit portions, in the burst signal region, in each of the servo areas, is formed as either a single concave portion or a single convex portion of the concavo-convex shape of the recording layer, of which concavo-convex direction is opposite to that of the burst signal unit portions.

14. The magnetic recording medium according to claim 13, wherein
the burst signal unit portions are formed as the concave portions.

15. The magnetic recording medium according to claim 12, wherein
the burst signal unit portions are formed as the concave portions.

16. The magnetic recording medium according to claim 11, wherein
all other portion surrounding the burst signal unit portions, in the burst signal region, in each of the servo areas, is formed as either a single concave portion or a single convex portion of the concavo-convex shape of the recording layer, of which concavo-convex direction is opposite to that of the burst signal unit portions.

17. The magnetic recording medium according to claim 16, wherein
the burst signal unit portions are formed as the concave portions.

18. The magnetic recording medium according to claim 11, wherein
the burst signal unit portions are formed as the concave portions.

19. A magnetic recording/reproducing apparatus comprising
the magnetic recording medium according to claim 11, and
the magnetic head for recording/reproducing data in close proximity to a surface of the magnetic recording medium.

20. A stamper for manufacturing the magnetic recording medium according to claim 11 comprising
a transfer surface having a concavo-convex shape corresponding to the concavo-convex shape of the recording layer in the magnetic recording medium.

* * * * *